(12) United States Patent
Suzuki

(10) Patent No.: US 12,320,784 B2
(45) Date of Patent: Jun. 3, 2025

(54) ARTICLE ORIENTATION CHANGE DEVICE

(71) Applicant: ANRITSU CORPORATION, Kanagawa (JP)

(72) Inventor: Takashi Suzuki, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 331 days.

(21) Appl. No.: 18/159,849

(22) Filed: Jan. 26, 2023

(65) Prior Publication Data

US 2023/0243723 A1 Aug. 3, 2023

(30) Foreign Application Priority Data

Feb. 2, 2022 (JP) ................................. 2022-015027

(51) Int. Cl.
*G01N 3/40* (2006.01)
*B65G 43/08* (2006.01)
*G01N 3/02* (2006.01)
*G01N 3/06* (2006.01)

(52) U.S. Cl.
CPC ................. *G01N 3/40* (2013.01); *G01N 3/06* (2013.01); *G01N 2203/0076* (2013.01); *G01N 2203/0206* (2013.01)

(58) Field of Classification Search
CPC .... G01N 3/40; G01N 3/06; G01N 2203/0076; G01N 2203/0206; G01N 3/08; G01N 33/15; G01N 2203/0019; G01N 2203/0087; G01B 5/00
See application file for complete search history.

(56) References Cited

U.S. PATENT DOCUMENTS

| | | | |
|---|---|---|---|
| 6,260,419 B1 * | 7/2001 | Kramer | G01N 3/40 |
| | | | 73/78 |
| 2003/0209098 A1 * | 11/2003 | Kalbermatten | G01G 17/00 |
| | | | 414/757 |
| 2015/0033869 A1 | 2/2015 | Forcella et al. | |
| 2015/0040678 A1 * | 2/2015 | Boss | G01N 1/00 |
| | | | 73/800 |

FOREIGN PATENT DOCUMENTS

JP 6089038 B2 3/2017

* cited by examiner

*Primary Examiner* — Brandi N Hopkins
(74) *Attorney, Agent, or Firm* — McDonald Hopkins LLC

(57) ABSTRACT

An article orientation change device 30 includes a flap 11 is provided so as to be vertically swingable about a swing shaft 13 as a fulcrum, a conveying member 25 that pushes out a tablet W to a predetermined position on the placement surface 11a, and a pressing member 12 that presses the tablet W against the wall portion 1A, in which a tapered surface 25A is provided on a facing surface of the conveying member 25, the conveying member 25 conveys the tablet W to the placement surface 11a to push out the tablet W to the predetermined position in a state where the tablet W maintains the first orientation, and the pressing member 12 moves in a direction approaching the wall portion 1A to change an orientation of the tablet W on the placement surface 11a from the first orientation to a second orientation.

18 Claims, 7 Drawing Sheets

ARTICLE ORIENTATION CHANGE DEVICE

TECHNICAL FIELD

The present invention relates to an article orientation change device.

BACKGROUND ART

A tablet test device described in Patent Document 1 is known as a measuring device for measuring the length and hardness (breaking strength) of a non-circular article such as an elliptical article.

As illustrated in FIGS. 8A and 8B of Patent Document 1, this tablet measuring device includes a flap that can swing about an axis as a fulcrum, a surface that projects upward from one end portion of the flap, a fixed fracture surface adjacent to the flap, and a fracture surface provided close to and separated from the fixed fracture surface and presses an elliptical tablet having a long axis and a short axis against the fixed fracture surface.

When the flap swings downward about the axis as a fulcrum, the tablet positioned on the flap abuts against the surface due to the weight, and the long axis direction is oriented in the same direction as the movement direction of the fracture surface. By pressing the flap against the fixed fracture surface with the fracture surface in this state, the long axis length and hardness of the tablet are measured.

RELATED ART DOCUMENT

Patent Document

[Patent Document 1] Japanese Patent No. 6089038

DISCLOSURE OF THE INVENTION

Problem that the Invention is to Solve

However, in the tablet measuring device in the related art, although the tablet can be positioned in the long axis direction by swinging the flap, there is no means for positioning the flap in the short axis direction. Therefore, the orientation of the tablet cannot be changed in both the short axis direction and the long axis direction.

Accordingly, it is an object of the present invention to provide an article orientation change device with a simple configuration that can easily change the orientation of the article in the long axis direction and the short axis direction on one placement member.

Means for Solving the Problem

According to a first aspect of the present invention, there is provided an article orientation change device that changes an orientation of a non-circular article having a long axis and a short axis orthogonal to the long axis, the device including a placement member that includes a placement surface on which the article is placed and a projecting portion projecting upward from the placement surface, and is provided so as to be vertically swingable about a first swing shaft as a fulcrum, a first moving member that is provided so as to be movable in a direction facing a wall surface formed by the projecting portion and approaching the projecting portion and in a direction away from the projecting portion, and moves in the direction approaching the projecting portion to push out the article to a predetermined position on the placement surface, a wall portion that is provided adjacent to the placement member in a direction orthogonal to a movement direction of the first moving member, and a second moving member that is provided so as to be movable in a direction facing the wall portion and approaching the projecting portion and in a direction away from the wall portion, and moves in the direction approaching the wall portion to press the article against the wall portion, in the direction orthogonal to the movement direction of the first moving member, in which on a facing surface of the first moving member facing the wall surface of the projecting portion in the movement direction of the first moving member, a contact portion that contacts the article is provided so that the long axis of the article is in a first orientation oblique to the movement direction of the first moving member, the first moving member pushes out the article to the predetermined position on the placement surface in a state where the article maintains the first orientation, and the second moving member moves in the direction approaching the wall portion to change an orientation of the article pushed out to the predetermined position on the placement surface from the first orientation to a predetermined orientation.

With this configuration, the first moving member conveys the article to the placement surface in a state of maintaining the first orientation in which the long axis is oblique to the movement direction of the first moving member, and then the second moving member is moved in a direction approaching the wall portion to bringing the second moving member into contact with the article. Therefore, the orientation of the article may be easily changed from the first orientation to a predetermined orientation, for example, from the first orientation to the orientation in which the long axis of the article is parallel to the movement direction of the first moving member.

Next, since the placement member is swung upward with the swing shaft as a fulcrum, and the article is moved by the own weight along the placement surface to the projecting portion to be brought into contact with the projecting portion, the orientation of the article may be easily changed from the second orientation to the third orientation.

As described above, the article orientation change device having a simple configuration including the wall portion, the placement member, the first moving member, and the second moving member may easily change the orientation of the article to a plurality of orientations (first orientation, second orientation, and third orientation) on the placement surface.

In addition, according to a second aspect of the present invention, in the article orientation change device according to the first aspect, the predetermined orientation is a second orientation in which the long axis of the article is parallel to the movement direction of the first moving member, in a state where the first moving member is separated from the placement surface, the second moving member changes the orientation of the article from the first orientation to the second orientation by moving the article in the first orientation at the predetermined position on the placement surface toward the wall portion, and next, in a state where the second moving member is separated from the placement surface, by swinging the placement member upward from a horizontal posture, the article is abutted against the wall surface of the projecting portion, and the orientation of the article is changed from the second orientation to a third orientation in which the long axis is in the same direction as a movement direction of the second moving member.

With this configuration, the orientation of the article may be easily changed between the short axis direction and the long axis direction on the same placement surface, and the installation space for the article orientation change device may be reduced.

In addition, according to a third aspect of the present invention, in the article orientation change device according to the first aspect, in a plan view of the first moving member, the contact portion is a tapered surface oblique to the movement direction of the first moving member.

With this configuration, when the article comes into contact with the tapered surface of the first moving member, the orientation of the article may be maintained in the first orientation in which the long axis is oblique to the movement direction of the first moving member.

In addition, according to a fourth aspect of the present invention, in the article orientation change device according to the second aspect, in a plan view of the first moving member, the contact portion is a tapered surface oblique to the movement direction of the first moving member.

With this configuration, when the article comes into contact with the tapered surface of the first moving member, the orientation of the article may be maintained in the first orientation in which the long axis is oblique to the movement direction of the first moving member.

In addition, according to a fifth aspect of the present invention, in the article orientation change device according to the first aspect, in a plan view of the first moving member, the contact portion is configured to include a V-shaped groove portion recessed in the direction away from the projecting portion with respect to the facing surface of the first moving member.

With this configuration, when the contact portion of the first moving member comes into contact with the article, the orientation of the article may be maintained in the first orientation in which the long axis is oblique to the movement direction of the first moving member.

In addition, according to a sixth aspect of the present invention, in the article orientation change device according to the second aspect, in a plan view of the first moving member, the contact portion is configured to include a V-shaped groove portion recessed in the direction away from the projecting portion with respect to the facing surface of the first moving member.

With this configuration, when the contact portion of the first moving member comes into contact with the article, the orientation of the article may be maintained in the first orientation in which the long axis is oblique to the movement direction of the first moving member.

In addition, according to a seventh aspect of the present invention, in the article orientation change device according to the first aspect, in a plan view of the placement member, the placement member is provided so as to be swingable about a second swing shaft orthogonal to the first swing shaft as a fulcrum.

With this configuration, when the placement member is swung with the second swing shaft as a fulcrum so that the wall portion side of the placement member faces downward, by bringing the article into contact with the wall portion, the orientation of the article may be easily changed from the first orientation to the second orientation.

Therefore, when the second moving member is moved in a direction approaching the wall portion to bring the second moving member into contact with the article, the orientation of the article may be reliably maintained in the second orientation.

In addition, according to an eighth aspect of the present invention, in the article orientation change device according to the second aspect, in a plan view of the placement member, the placement member is provided so as to be swingable about a second swing shaft orthogonal to the first swing shaft as a fulcrum.

With this configuration, when the placement member is swung with the second swing shaft as a fulcrum so that the wall portion side of the placement member faces downward, by bringing the article into contact with the wall portion, the orientation of the article may be easily changed from the first orientation to the second orientation.

Therefore, when the second moving member is moved in a direction approaching the wall portion to bring the second moving member into contact with the article, the orientation of the article may be reliably maintained in the second orientation.

In addition, according to a ninth aspect of the present invention, there is provided an article orientation change device that changes an orientation of a non-circular article having a long axis and a short axis orthogonal to the long axis, the device including a placement member that includes a placement surface on which the article is placed and a projecting portion projecting upward from the placement surface, is provided so as to be vertically swingable about a first swing shaft as a fulcrum, and is provided so as to be swingable about a second swing shaft orthogonal to the first swing shaft with the second swing shaft as a fulcrum, a first moving member that is provided so as to be movable in a direction facing a wall surface formed by the projecting portion and approaching the projecting portion and in a direction away from the projecting portion, and moves in the direction approaching the projecting portion to push out the article to a predetermined position on the placement surface, a wall portion that is provided adjacent to the placement member in a direction orthogonal to a movement direction of the first moving member, and a second moving member that is provided so as to be movable in a direction facing the wall portion and approaching the projecting portion and in a direction away from the wall portion, and moves in the direction approaching the wall portion to press the article against the wall portion, in the direction orthogonal to the movement direction of the first moving member, in which the first moving member pushes out the article to the predetermined position on the placement surface in a fourth orientation in which an orientation of the article is uncertain, and when the article is conveyed onto the placement surface by the first moving member, the placement member swings about the second swing shaft as a fulcrum in a direction of the wall portion to abut the article against the wall portion, so that the orientation of the article is changed from the fourth orientation to a predetermined orientation.

As described above, when the article is conveyed onto the placement surface by the first moving member, the placement member swings about the second swing shaft as a fulcrum in the direction of the wall portion to abut the article against the wall portion. Therefore, the orientation of the article may be easily changed from a predetermined orientation, for example, the fourth orientation to an orientation in which the long axis of the article is parallel to the movement direction of the first moving member.

Next, since the placement member is swung upward with the first swing shaft as a fulcrum, and the article is moved by the own weight along the placement surface to the projecting portion to be brought into contact with the projecting portion, the orientation of the article may be easily changed from the second orientation to the third orientation.

As described above, the article orientation change device having a simple configuration including the wall portion, the placement member, the first moving member, and the second moving member may easily change the orientation of the article to a plurality of orientations (fourth orientation, second orientation, and third orientation) on the placement surface.

In addition, according to a tenth aspect of the present invention, in the article orientation change device according to the ninth aspect, the predetermined orientation is a second orientation in which the long axis of the article is parallel to the movement direction of the first moving member, and by swinging the placement member upward from a horizontal posture by the first swing shaft, the article is abutted against the wall surface of the projecting portion, and the orientation of the article is changed from the second orientation to a third orientation in which the long axis is in the same direction as a movement direction of the second moving member.

As a result, the orientation of the article may be easily changed between the short axis direction and the long axis direction on the same placement surface, and the installation space for the article orientation change device may be reduced.

In addition, according to an eleventh aspect of the present invention, in the article orientation change device according to the second aspect, the device further includes a measuring portion that measures a length in a short axis direction, a length in a long axis direction, and hardness of the article, in which when the article in the second orientation on the placement surface is pressed against the wall portion by the second moving member, the measuring portion measures the length in the short axis direction of the article, and when the article in the third orientation on the placement surface is pressed against the wall portion by the second moving member, the measuring portion measures the length in the long axis direction and the hardness of the article.

With this configuration, the length in the short axis direction and the length in the long axis direction of the article may be measured on the same placement surface, and the time for measuring the shape of the article may be shortened.

In addition, since the hardness of the article may be continuously measured on the same placement surface after measuring the length of the article in the long axis direction, the shape and hardness of the article may be easily measured on the same placement surface, the time for measuring the shape and hardness of the article may be shortened, and the installation space for the article orientation change device may be reduced.

In addition, according to a twelfth aspect of the present invention, in the article orientation change device according to the tenth aspect, the device further includes a measuring portion that measures a length in a short axis direction, a length in a long axis direction, and hardness of the article, in which when the article in the second orientation on the placement surface is pressed against the wall portion by the second moving member, the measuring portion measures the length of the article in the short axis direction, and when the article in the third orientation on the placement surface is pressed against the wall portion by the second moving member, the measuring portion measures the length in the long axis direction and hardness of the article.

With this configuration, the length in the short axis direction and the length in the long axis direction of the article may be measured on the same placement surface, and the time for measuring the shape of the article may be shortened.

In addition, since the hardness of the article may be continuously measured on the same placement surface after measuring the length of the article in the long axis direction, the shape and hardness of the article may be easily measured on the same placement surface, the time for measuring the shape and hardness of the article may be shortened, and the installation space for the article orientation change device may be reduced.

In addition, according to a thirteenth aspect of the present invention, in the article orientation change device according to the first aspect, the wall surface of the projecting portion extends linearly along a movement direction of the second moving member.

With this configuration, the long axis of the article may be extended along the projecting portion in a case where the article is in the third orientation. Therefore, the article may be moved parallel to the wall portion along the projecting portion by the second moving member. Therefore, it is possible to prevent the article from tilting and maintain the orientation of the article in the third orientation.

In addition, according to a fourteenth aspect of the present invention, in the article orientation change device according to the ninth aspect, the wall surface of the projecting portion extends linearly along a movement direction of the second moving member.

With this configuration, the long axis of the article may be extended along the projecting portion in a case where the article is in the third orientation. Therefore, the article may be moved parallel to the wall portion along the projecting portion by the second moving member. Therefore, it is possible to prevent the article from tilting and maintain the orientation of the article in the third orientation.

In addition, according to a fifteenth aspect of the present invention, in the article orientation change device according to the first aspect, the device further includes a discharge portion that discharges the article, in which when the placement member swings downward from a horizontal posture, the article is discharged from the placement surface to the discharge portion.

With this configuration, the article may be discharged from the placement surface to the discharge portion only by swinging the placement member downward from the horizontal posture. As a result, the article crushed during the hardness measurement of the article may be easily removed from the placement surface in a short time, a new article may be conveyed to the placement surface, and the inspection time of the article may be significantly shortened. In addition to this, the discharge portion and the placement member may be installed on the same plane, and the installation area of the article orientation change device may be reduced.

In addition, according to a sixteenth aspect of the present invention, in the article orientation change device according to the ninth aspect, the device further includes a discharge portion that discharges the article, in which when the placement member swings downward from a horizontal posture, the article is discharged from the placement surface to the discharge portion.

With this configuration, the article may be discharged from the placement surface to the discharge portion only by swinging the placement member downward from the horizontal posture. As a result, the article crushed during the hardness measurement of the article may be easily removed from the placement surface in a short time, a new article may be conveyed to the placement surface, and the inspection time of the article may be significantly shortened. In addition to this, the discharge portion and the placement member may be installed on the same plane, and the installation area of the article orientation change device may be reduced.

In addition, according to a seventeenth aspect of the present invention, in the article orientation change device according to the second aspect, in a plan view of the placement member, the projecting portion is provided so as to be rotatable with respect to the placement surface of the placement member.

As a result, by rotating the projecting portion in a state where the placement member swings upward from the horizontal posture, the projecting portion may reliably change the orientation of the article from the second orientation to the third orientation.

In addition, according to an eighteenth aspect of the present invention, in the article orientation change device according to the tenth aspect, in a plan view of the placement member, the projecting portion is provided so as to be rotatable with respect to the placement surface of the placement member.

As a result, by rotating the projecting portion in a state where the placement member swings upward from the horizontal posture, the projecting portion may reliably change the orientation of the article from the second orientation to the third orientation.

Advantage of the Invention

The present invention can provide the article orientation change device with a simple configuration that can easily change the orientation of the article in the long axis direction and the short axis direction on one placement member.

BEST MODE FOR CARRYING OUT THE INVENTION

Hereinafter, with reference to the drawings, a configuration of an article orientation change device according to an embodiment of the present invention will be described based on FIGS. 1 to 8.

Figure 1:
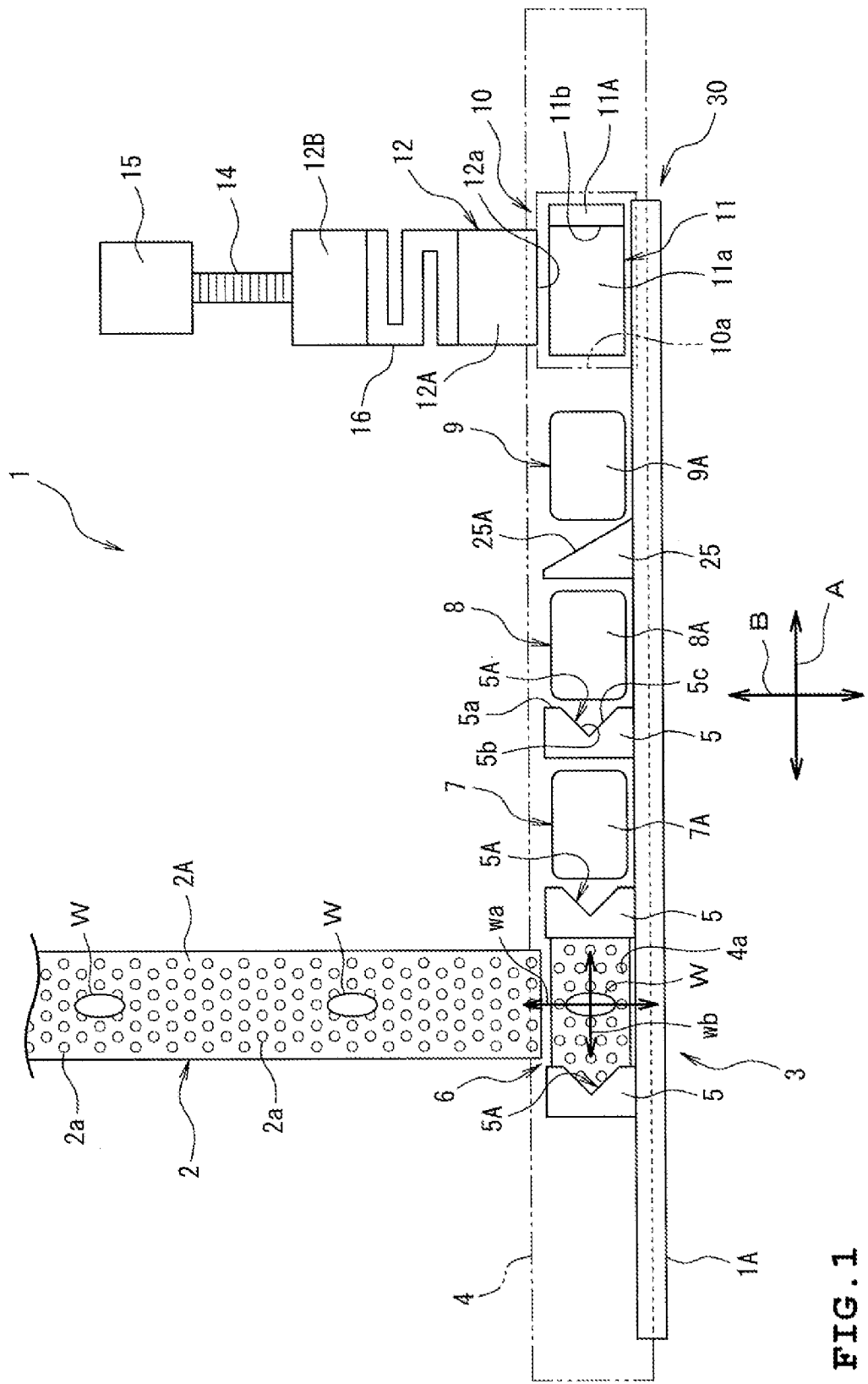
FIG. 1 is a schematic plan view of an article inspection apparatus provided with an article orientation change device according to an embodiment of the present invention.

In FIG. 1, an article inspection apparatus 1 according to one embodiment is provided with an upstream article conveying portion 2 and a downstream article conveying portion 3, and an article orientation change device 30 is installed in the downstream article conveying portion 3. That is, the article orientation change device 30 of the present embodiment is provided in the article inspection apparatus 1.

The articles to be inspected (orientation to be changed) includes an article having a predetermined shape and a molded article manufactured by an existing manufacturing facility or a manufacturing facility having no inspection function, and particularly an article whose shape does not change during a conveyance process, in addition to an article having an outer diameter φ: several mm to several tens of mm that can be conveyed individually without packaging, and a bite-sized article.

Examples of the articles include the pharmaceuticals formed as a tablet, a capsule, a troche or a drop, the confectioneries such as a candy or a chocolate, and the like. Hereinafter, a non-circular, for example, elliptical tablet W having a long axis wa and a short axis wb orthogonal to the long axis wa will be described as an example of an article to be inspected. The tablet W of the present embodiment constitutes an article.

The upstream article conveying portion 2 aligns and linearly conveys the tablets W separated one by one. Upstream and downstream are defined as the direction where the tablets W are conveyed. That is, the downstream article conveying portion 3 is positioned downstream with respect to the upstream article conveying portion 2, and the upstream article conveying portion 2 is positioned upstream with respect to the downstream article conveying portion 3.

The upstream article conveying portion 2 is provided with a placement portion 2A having a plurality of openings 2*a*, and a conveying member (not illustrated) that conveys the tablet W placed on the placement portion 2A to the downstream article conveying portion 3 along the placement portion 2A.

In the upstream article conveying portion 2, small fragments of the tablets W conveyed toward the downstream article conveying portion 3 on the placement portion 2A are dropped from the opening 2*a* of the placement portion 2A.

The downstream article conveying portion 3 is provided with a placement portion 4 on which the tablets W conveyed from the upstream article conveying portion 2 are placed, and the placement portion 4 extends linearly.

A plurality of (four in the present embodiment) conveying members 5 and 25 are installed above the placement portion 4, and the conveying member 5 is attached to a wall portion 1A.

The article inspection apparatus 1 has a main body case (not illustrated), and the main body case contains the upstream article conveying portion 2 and the downstream article conveying portion 3. The placement portion 4 is configured to include a portion of the main body case, and the wall portion 1A is provided so as to be movable with respect to the main body case.

The wall portion 1A is provided adjacent to the placement portion 4 in a direction B orthogonal to the movement direction A of the conveying member 5. The movement direction A of the conveying member 5 is the horizontal direction, and the direction B orthogonal to the movement direction A of the conveying member 5 is the direction B orthogonal to the movement direction A in the horizontal plane.

The wall portion 1A extends linearly along the movement direction A of the conveying member 5 and also extends in the vertical direction. The conveying member 5 is attached to the wall portion 1A at equal intervals in the extending direction of the placement portion 4, that is, the conveying direction of the tablets W, and moves integrally with the wall portion 1A with respect to the main body case.

In addition, in a case where the tablet W placed on the placement portion 4 moves toward the wall portion 1A, the tablet W can be prevented from dropping from the placement portion 4 by abutting against the wall portion 1A.

The conveying member 5 is movable integrally with the wall portion 1A in the extending direction of the placement portion 4 by an actuator 21 (refer to FIG. 3), and the conveying member 5 moves integrally in one side (left side in the drawing) and the other side (right side in the drawing) of the conveying direction A.

The conveying member 5 is movable integrally with the wall portion 1A by the actuator 21 in a direction approaching the placement portion 4 and a direction away from the placement portion 4. That is, the conveying member 5 is vertically movable with respect to the placement portion 4. The conveying member 5 of the present embodiment constitutes a first moving member.

The downstream article conveying portion 3 is provided with an article loading portion 6, a weighing portion 7, an article discharge portion 8, a thickness measuring portion 9, and a diameter/hardness measuring portion 10 from upstream to downstream in the movement direction A of the conveying member 5. The movement direction A of the conveying member 5, the extending direction of the placement portion 4, and the conveying direction of the tablets W are the same as each other.

The article loading portion 6 is installed on the downstream side of the placement portion 2A, and the tablets W are loaded into the article loading portion 6 from the placement portion 2A. A plurality of openings 4a are formed in the placement portion 4 of the article loading portion 6, and small fragments of the tablets W are dropped from the openings 2a of the article loading portion 6.

The weighing portion 7 is installed downstream of the article loading portion 6. A weighing scale 7A is provided in the weighing portion 7, and the weighing scale 7A has an area larger than the size of the tablet W in a plan view (within the horizontal plane) in FIG. 1. The weighing scale 7A measures the weight of the tablet W in the weighing portion 7 and transmits the measurement result to a control unit 20 (refer to FIG. 3).

The article discharge portion 8 is installed downstream of the weighing portion 7. The article discharge portion 8 is provided with a discharge table 8A. The discharge table 8A has an area larger than the size of the tablet W in a plan view in FIG. 1, and is swung by the actuator 22 about a swing shaft (not illustrated) as a fulcrum.

For example, in a case where the weight of the tablet W measured by the weighing scale 7A is larger than the weight of the individual tablet W, the control unit 20 determines that two or more tablets W are conveyed to the weighing portion 7, and operates the actuator 22 when the tablets W are conveyed from the weighing portion 7 to the article discharge portion 8. As a result, the discharge table 8A swings about the swing shaft as a fulcrum, and the tablet W is discharged downward from the article discharge portion 8.

For example, in a case where the weight of the tablet W measured by the weighing scale 7A is equal to or greater than a specified value that is larger than the average weight of the individual tablets W, the control unit 20 determines that two or more tablets W are conveyed to the weighing portion 7.

In a case where the weight of the tablet W is approximately twice the average weight of the individual tablets W, the control unit 20 determines that two tablets W are conveyed to the weighing portion 7, and in a case where the weight of the tablet W is approximately three times the average weight of the individual tablets W, the control unit 20 determines that three tablets W are conveyed to the weighing portion 7.

The thickness measuring portion 9 is installed downstream of the article discharge portion 8. The thickness measuring portion 9 is provided with a measuring instrument 9A for measuring the thickness of the tablet W.

The measuring instrument 9A has, for example, a contact surface that is in contact with the tablet W from above, and is provided so as to be vertically movable with respect to the placement portion 4. The control unit 20 measures the stroke amount of the measuring instrument 9A until the contact surface of the measuring instrument 9A contacts the tablet W from the reference position, and measures the thickness (vertical length) of the tablet W from the stroke amount.

The control unit 20 is configured to include a computer unit provided with a central processing unit (CPU), a random access memory (RAM), a read only memory (ROM), a hard disk device, and an input/output port, all of which are not illustrated.

Figure 2A:
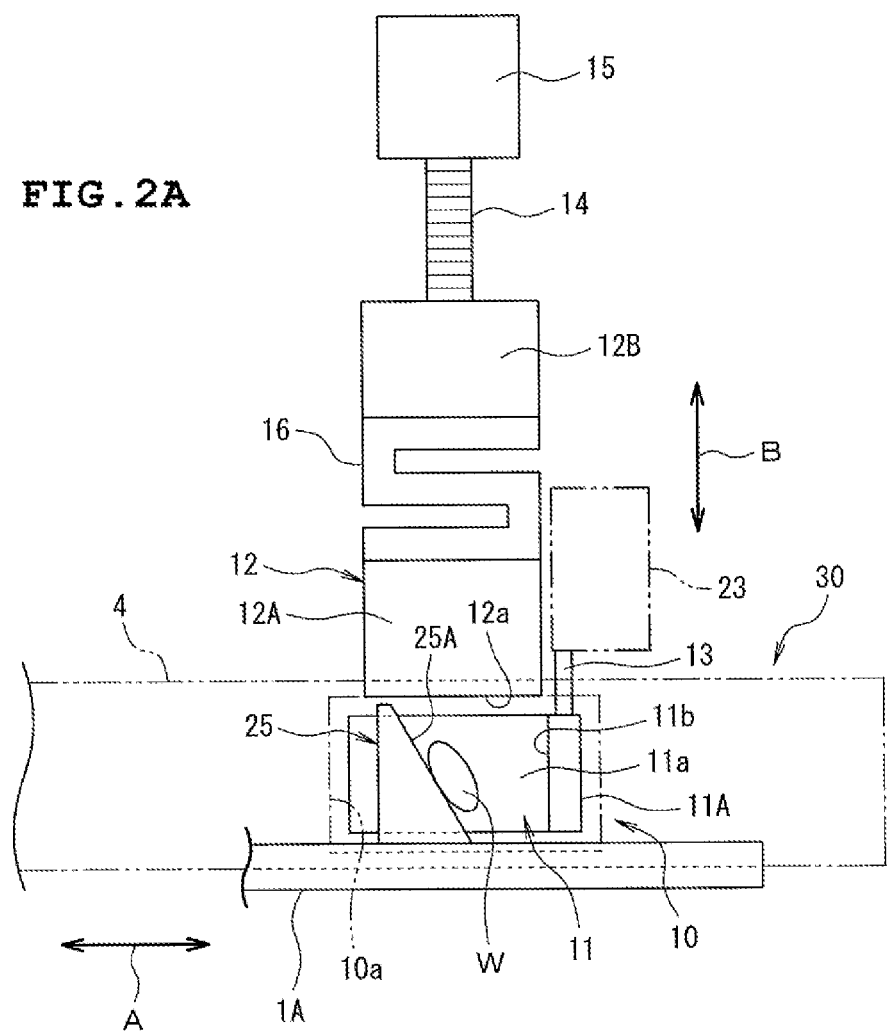
FIG. 2A is a schematic plan view of the article orientation change device according to the embodiment of the present invention.
Figure 2B:
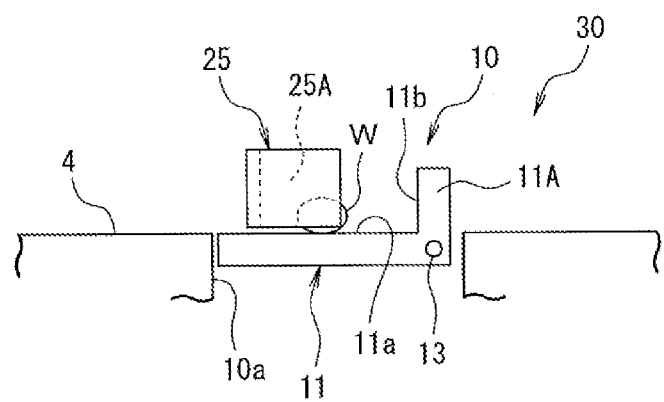
FIG. 2B is a schematic side view of the article orientation change device according to the embodiment of the present invention.
Figure 3:
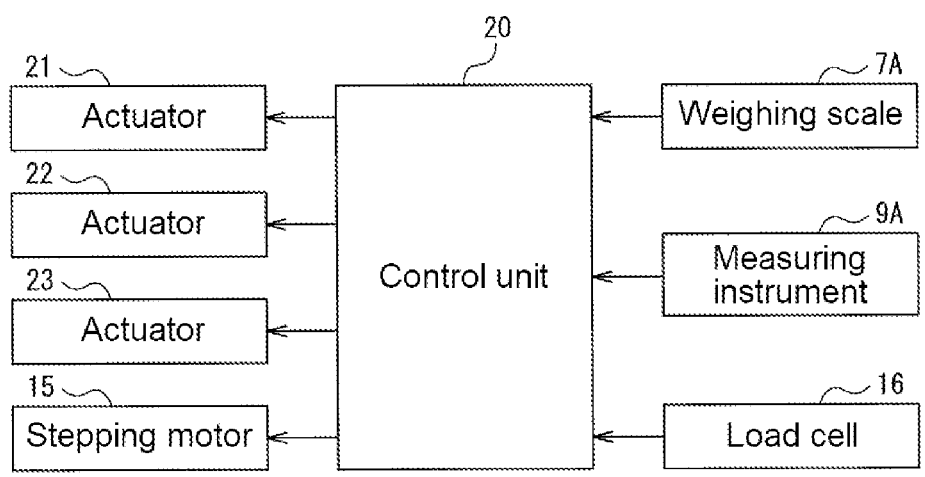
FIG. 3 is a system configuration diagram of the article inspection apparatus provided with the article orientation change device according to the embodiment of the present invention.

The diameter/hardness measuring portion 10 is installed downstream of the thickness measuring portion 9. As illustrated in FIGS. 1, 2A, and 2B, the diameter/hardness measuring portion 10 is provided with a wall portion 1A, a conveying member 5, a flap 11, and a pressing member 12.

The flap 11 of the present embodiment constitutes a placement member, and the pressing member 12 constitutes a second moving member.

As illustrated in FIGS. 2A and 2B, the flap 11 is provided with a placement surface 11a on which the tablet W is placed, and the placement surface 11a is formed flat. One end portion of the flap 11, that is, one end portion of the flap 11 in the movement direction A of the conveying member 5 is provided with a projecting portion 11A, and the projecting portion 11A projects upward from the placement surface 11a. The projecting portion 11A projects perpendicularly to the placement surface 11a of the flap 11.

A swing shaft 13 is provided at one end portion of the flap 11, and the swing shaft 13 is fixed to the flap 11.

The swing shaft 13 is supported by an actuator 23, and when the swing shaft 13 is rotated about the axis by the actuator 23, the flap 11 swings vertically about the swing shaft 13 as a fulcrum. The swing shaft 13 extends in the same direction as the movement direction B of the pressing member 12.

The actuator 23 may be configured to include, for example, a timing belt connected to the swing shaft 13 and a motor that drives the timing belt, or may be configured to include a gear provided on the swing shaft 13, a reduction gear connected to the gear, and a motor that drives the gear of the swing shaft 13 via the reduction gear. The configuration of the actuator 23 is not limited to these components.

The conveying member 5 faces a wall surface 11*b* formed by the projecting portion 11A, and is provided so as to be movable in a direction approaching the projecting portion 11A and a direction away from the projecting portion 11A. The conveying member 5 moves in a direction approaching the projecting portion 11A (that is, movement direction A) to push out the tablet W to a predetermined position on the placement surface 11*a* of the flap 11.

The wall surface 11*b* formed by the projecting portion 11A is a surface facing the conveying member 5 in the movement direction A of the conveying member 5, and the wall surface 11*b* extends linearly along the movement direction B of the pressing member 12.

The pressing member 12 is provided to face the wall portion 1A in a direction B orthogonal to the movement direction A of the conveying member 5 (hereinafter, also referred to as a movement direction B of the pressing member 12), and is provided so as to be movable in a direction approaching the wall portion 1A and a direction away from the wall portion 1A.

Specifically, the pressing member 12 is formed with a screw groove (not illustrated) into which a ball screw 14 is screwed, and the ball screw 14 is connected to an output shaft of a stepping motor 15.

The stepping motor 15 moves the pressing member 12 in the movement direction B by rotating the ball screw 14 based on a command from the control unit 20. The stepping motor 15 may be connected to the ball screw 14 via a timing belt, and the power of the stepping motor 15 may be transmitted to the ball screw 14 via the timing belt.

The conveying member 5 is provided with a groove portion 5A. The groove portion 5A is provided on a facing surface 5*a* of the conveying member 5 that faces the wall surface 11*b* of the projecting portion 11A in the movement direction A of the conveying member 5, and contacts the tablet W so that the long axis wa of the tablet W maintains the first orientation inclined with respect to the movement direction A of the conveying member 5.

Specifically, in a plan view of the conveying member 5, the groove portion 5A is formed in a V-shape recessed in a direction away from the projecting portion 11A with respect to the facing surface 5*a* of the conveying member 5, and has tapered surfaces 5*b* and 5*c* that are inclined at an angle of 45° with respect to the movement direction A of the conveying member 5. The inclination angles of the tapered surfaces 5*b* and 5*c* with respect to the movement direction A of the conveying member 5 are not limited to 45°.

In a state where the tablets W is loaded from the upstream article conveying portion 2 to the article loading portion 6, when the conveying member 5 moves onto the placement portion 4 of the article loading portion 6, the tablets W is inserted into the groove portion 5A along the tapered surface 5*b* or the tapered surface 5*c*.

As illustrated in FIGS. 1, 2A, and 2B, a conveying member 25 downstream of the three conveying members 5 in the conveying direction of the tablet W is provided with a tapered surface 25A.

The tapered surface 25A is provided on the facing surface of the conveying member 25 that faces the wall surface 11*b* of the projecting portion 11A in the movement direction A of the conveying member 25, and contacts the tablet W so that the long axis wa of the tablet W is in the first orientation inclined with respect to the movement direction A of the conveying member 25. The tapered surface 25A of the present embodiment constitutes a contact portion.

Specifically, the tapered surface 25A is inclined at an angle of 40° with respect to the movement direction A of the conveying member 25 in a plan view of the conveying member 25. The inclination angle of the tapered surface 25A with respect to the movement direction A of the conveying member 5 is not limited to 40°.

When the tablet W comes into contact with the tapered surface 25A of the most downstream conveying member 25 in the conveying direction of the tablet W, the orientation of the tablet W is changed to the first orientation that is inclined by approximately 40° with respect to the movement direction A of the conveying member 25, and the first orientation is maintained in the first orientation until the conveying member 25 is conveyed to the diameter/hardness measuring portion 10 on the placement portion 4.

The inclination angle of the groove portion 5A of the conveying member 5 and the inclination angle of the tapered surface 25A may be the same angle. In addition, the fact that the inclination angle of the groove portion 5A of the conveying member 5 is made larger than the inclination angle of the tapered surface 25A is because the groove portion 5A is deeper, and the tablet W can be easily inclined and reliably held, when the inclination angle of the groove portion 5A of the conveying member 5 is increased.

When the conveying member 25 moves to the diameter/hardness measuring portion 10 and the tablet W is pushed out to a predetermined position on the placement surface 11*a* of the flap 11, the conveying member 25 moves in a direction away from the projecting portion 11A.

The contact surface 12*a* of the pressing member 12 is formed on a plane parallel to the movement direction A of the conveying member 25, and the contact surface 12*a* contacts the tablet W.

Since the pressing member 12 moves on the placement surface 11*a* of the flap 11 toward the wall portion 1A, the orientation of the tablet W in the first orientation at a predetermined position on the placement surface 11*a* is changed from the first orientation to the second orientation in which the long axis wa is parallel to the movement direction A of the conveying member 25, and the tablet W in the second orientation is pressed against the wall portion LA. The second orientation of the present embodiment constitutes a predetermined orientation.

In a case where the conveying member 25 and the pressing member 12 move on the placement surface 11*a* of the flap 11, the flap 11 is positioned in a horizontal posture.

When the flap 11 swings upward from the horizontal posture with the swing shaft 13 as a fulcrum, the wall surface 11*b* of the projecting portion 11A faces upward.

At this time, the tablet W moves along the placement surface 11*a* toward the projecting portion 11A side due to the own weight, and when the tablet W abuts against the projecting portion 11A, the orientation of the tablet W is changed from the second orientation to the third orientation in which the long axis wa is in the same direction as the movement direction B of the pressing member 12.

Here, the predetermined position on the placement surface 11*a* is a position where the contact surface 12*a* contacts the tablet W and the tablet W can be reliably moved toward the wall portion 1A due to the pressing member 12 moving on the placement surface 11*a* of the flap 11, and is a position away from the wall surface 11*b* of the projecting portion 11A in the movement direction A of the conveying member 25.

That is, if the tablet W is pushed out to a position that is infinitely close to the wall surface 11b of the projecting portion 11A or a position that abuts against the wall surface 11b by the conveying member 25, when the flap 11 swings upward about the swing shaft 13 as a fulcrum from the horizontal posture, the possibility that the orientation of the tablet W is not changed from the second orientation to the third orientation.

In the movement direction A of the conveying member 25, when the tablet W is pushed out to a position away from the wall surface 11b of the projecting portion 11A by the conveying member 25, when the flap 11 swings upward about the swing shaft 13 as a fulcrum from the horizontal posture, the distance from the predetermined position until the tablet W abuts against the wall surface 11b of the projecting portion 11A can be increased, and the orientation of the tablet W can be reliably changed from the second orientation to the third orientation.

When the pressing member 12 moves on the placement surface 11a of the flap 11, the predetermined position on the placement surface 11a may be a position where the contact surface 12a contacts the tablet W and the tablet W can be reliably moved toward the wall portion 1A.

In a state where the flap 11 swings in a horizontal posture about the swing shaft 13 as a fulcrum from a state of swinging upward about the swing shaft 13 as a fulcrum, the pressing member 12 moves on the placement surface 11a of the flap 11 toward the wall portion 1A, so that the tablet W on the placement surface 11a in the third orientation is pressed against the wall portion 1A.

A load cell 16 is provided on the pressing member 12. The pressing member 12 is divided into a front pressing member 12A and a rear pressing member 12B, and the load cell 16 is positioned between the front pressing member 12A and the rear pressing member 12B and is connected to the front pressing member 12A and the rear pressing member 12B.

A thread groove is formed in the rear pressing member 12B, and the ball screw 14 is screwed into the thread groove of the rear pressing member 12B.

When the stepping motor 15 rotates the ball screw 14 to move the rear pressing member 12B toward the wall portion LA, and the front pressing member 12A presses the tablets W against the wall portion 1A, the load cell 16 is distorted by transmitting the pressing force from the front pressing member 12A to the load cell 16.

The load cell 16 converts the amount of distortion of the load cell 16 into an electric signal as a pressing force, and transmits the signal to the control unit 20. The control unit 20 measures the hardness (breaking strength) of the tablet W based on the signal transmitted from the load cell 16.

In addition, the control unit 20 measures the length of the tablet W in the direction of the long axis wa (hereinafter referred to as a long axis direction) and the length of the tablet W in the direction of the short axis wb (hereinafter referred to as a short axis direction) when the pressing member 12 presses the tablet W against the wall portion 1A based on the pulse signal from the stepping motor 15. The load cell 16 and the control unit 20 of the present embodiment constitute a measuring portion.

As illustrated in FIGS. 1, 2A, and 2B, in the diameter/hardness measuring portion 10, a discharge hole 10a is formed in the placement portion 4, and the discharge hole 10a has an opening area larger than that of the flap 11 in a plan view.

The discharge hole 10a serves both as a hole for preventing the flap 11 from interfering with the placement portion 4 when the flap 11 swings in the vertical direction, and as a hole for discharging the tablet W crushed during hardness measurement of tablet W.

That is, when the flap 11 swings downward from the horizontal posture, the tablet W is discharged from the placement surface 11a of the flap 11 to the discharge hole 10a. A storage container (not illustrated) for storing the crushed tablets W is installed below the discharge hole 10a.

The discharge hole 10a of the present embodiment constitutes a discharge portion, and the wall portion 1A, the conveying member 25, the flap 11, and the pressing member 12 constitute the article orientation change device 30. Although the conveying member 5 is formed with the groove portion 5A, since the orientation of the tablet W may be finally changed by the conveying member 25, the conveying member 5 may not be formed with the groove portion 5A.

Next, a method of inspecting the tablet W will be described with reference to FIGS. 4A to 4E, and 5A to 5E. In addition, in FIGS. 4A to 4E, the placement portion 4 is illustrated only in FIG. 4A.

Figure 4A:
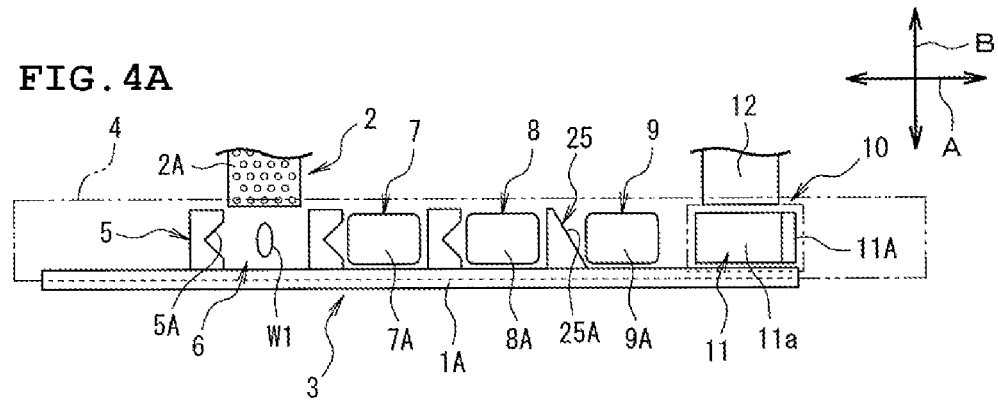
FIGS. 4A to 4E are diagrams illustrating a procedure for inspecting a tablet by the article inspection apparatus provided with the article orientation change device according to the embodiment of the present invention.
Figure 4B:
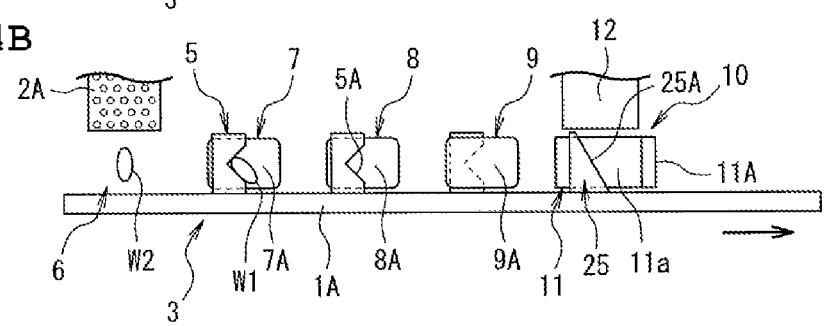

First, as illustrated in FIG. 4A, when tablet W1 is loaded from the placement portion 2A of the upstream article conveying portion 2 to the article loading portion 6 of the downstream article conveying portion 3, the tablet W1 loaded into the article loading portion 6 is conveyed to weighing portion 7 after being inserted into the groove portion 5A of the conveying member 5 that moves in a direction approaching the diameter/hardness measuring portion 10 on the placement portion 4 of the article loading portion 6 (refer to FIG. 4B).

At this time, the tablet W1 is inserted into the groove portion 5A along the tapered surface 5c, the orientation of the tablet W is changed to the first orientation that is inclined by approximately 45° with respect to the movement direction A of the conveying member 5, and the tablet W is conveyed to the weighing portion 7 while maintaining the first orientation. The tablet W1 is conveyed to the diameter/hardness measuring portion 10 while maintaining the first orientation.

Next, as illustrated in FIG. 4B, when the tablet W1 is conveyed to the weighing portion 7 by the conveying member 5, the weight of the tablet W1 is measured by the weighing scale 7A. In addition, while the tablet W1 is conveyed to the weighing portion 7 by the conveying member 5, the next tablet W2 to be inspected is loaded into the article loading portion 6 from the upstream article conveying portion 2.

Figure 4C:
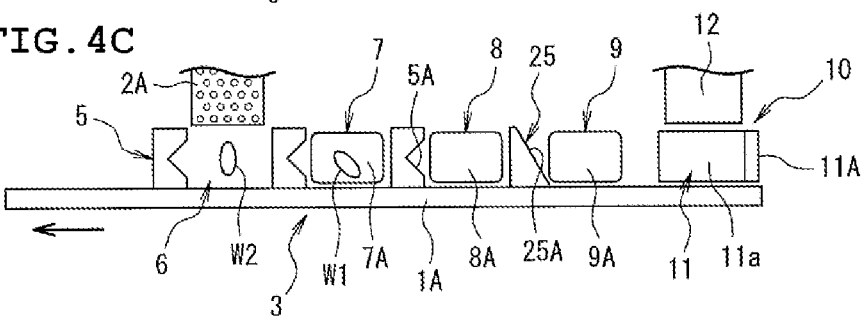

Next, after the conveying members 5 and 25 are moved upward by the actuator 21 integrally with the wall portion LA, the conveying members 5 and 25 are moved away from the diameter/hardness measuring portion 10 in the movement direction A of the conveying member 5, as illustrated in FIG. 4C. As a result, the conveying member 5 does not interfere with the tablets W1 and W2 placed on the placement portion 4. Therefore, the orientation of the tablet W1 can be reliably maintained in the first orientation.

Figure 4D:
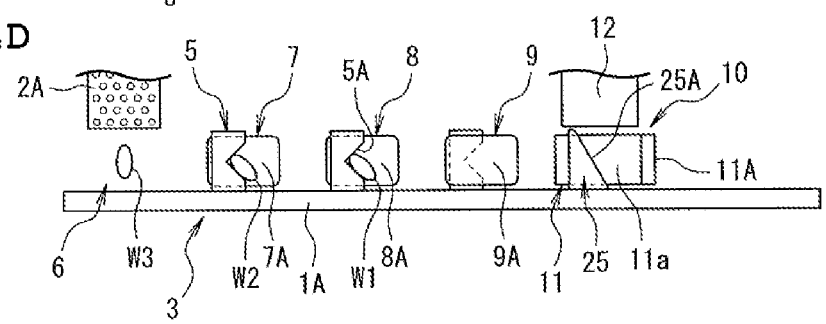

Next, after the conveying members 5 and 25 are moved downward integrally with the wall portion 1A by the actuator, the conveying members 5 and 25 are moved in a direction approaching the diameter/hardness measuring portion 10, and the tablet W2 loaded into the article loading portion 6 is inserted into the groove portion 5A of the conveying member 5 and changed to the first orientation, as illustrated in FIG. 4D.

In addition, while the tablet W2 is conveyed to the weighing portion 7 by the conveying member 5, the next tablet W3 to be inspected is loaded from the upstream article conveying portion 2 to the article loading portion 6, and the tablet W1 is conveyed to the article discharge portion 8 by the conveying member 5.

In a case where two or more tablets W are conveyed to the article discharge portion 8, the discharge table 8A is swung about the swing shaft as a fulcrum by the actuator 22, so that two or more tablets W are discharged from the article discharge portion 8.

Figure 4E:
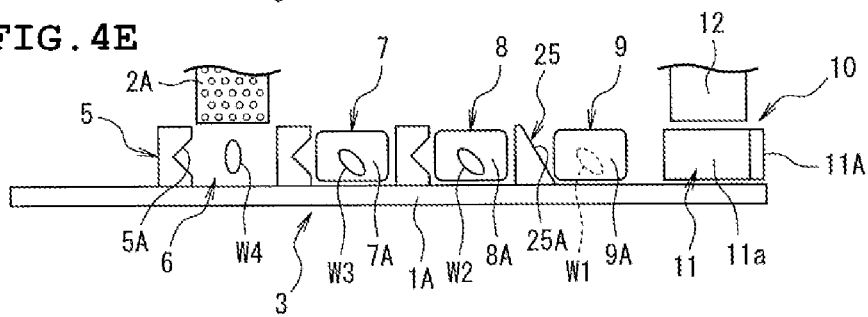

Next, the procedure of FIGS. 4C and 4D are performed, and the next tablet W4 to be inspected is loaded from the upstream article conveying portion 2 into the article loading portion 6 of the downstream article conveying portion 3, the previously loaded tablet W1 is conveyed to the thickness measuring portion 9 by the conveying member 5, and the thickness of the tablet W1 is measured by the measuring instrument 9A (refer to FIG. 4E).

Thereafter, the procedure of FIGS. 4C and 4D are repeated to convey the article W to the thickness measuring portion 9 by the conveying member 5.

Figure 5A:
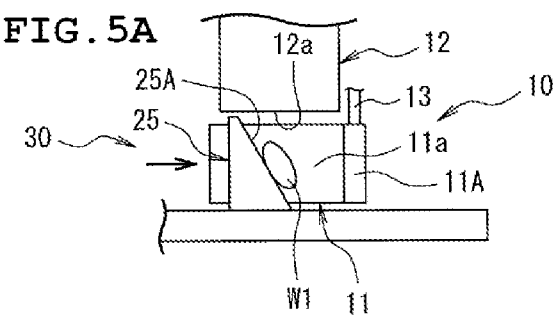
FIGS. 5A to 5E are diagrams illustrating a procedure for inspecting the tablet by the article orientation change device according to the embodiment of the present invention, the left sides of FIGS. 5A to 5E illustrate a schematic plan view, and the right sides illustrate a schematic side view.
Figure 5A:
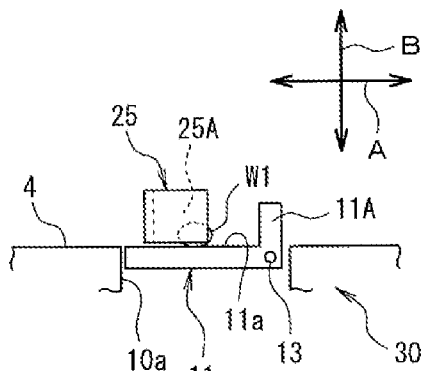

In FIG. 4E, when the thickness of the tablet W1 is measured by the thickness measuring portion 9, as illustrated in FIG. 5A, the tablet W1 contacts the tapered surface 25A of the conveying member 25, and is conveyed to the diameter/hardness measuring portion 10 by the conveying member 25 while maintaining the first orientation.

In the diameter/hardness measuring portion 10, the tablet W1 is conveyed to the placement surface 11a of the flap 11 by the conveying member 25, and pushed out to a predetermined position on the placement surface 11a while maintaining the first orientation.

Figure 5B:
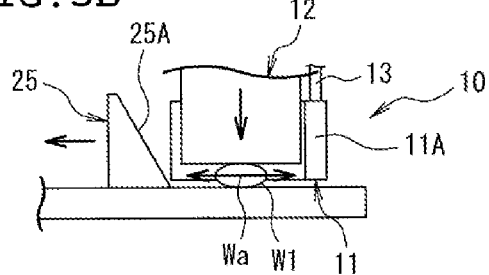
Figure 5B:
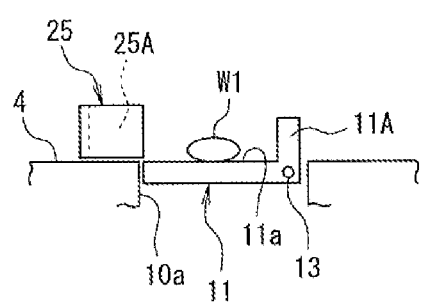

Next, as illustrated in FIG. 5B, when the conveying member 25 is moved in a direction away from the projecting portion 11A and the conveying member 25 is separated from the placement surface 11a of the flap 11, the pressing member 12 is moved in a direction approaching the wall portion 1A by the stepping motor 15.

When the pressing member 12 is moved in a direction approaching the wall portion 1A, the tablet W1, which is at a predetermined position on the placement surface 11a and is in the first orientation, is pressed against the contact surface 12a of the pressing member 12 and moved toward the wall portion 1A. The contact surface 12a is only illustrated in FIG. 5A.

The tablet W1 is changed from the first orientation to the second orientation while being moved toward the wall portion 1A by the pressing member 12, and the long axis wa faces in the same direction as the movement direction A of the conveying member 25. In this state, the tablet W1 is pressed against the wall portion 1A by the pressing member 12.

When the tablet W is pressed against the wall portion 1A, a signal corresponding to the pressing force is transmitted from the load cell 16 to the control unit 20. The control unit 20 calculates the number of pulses P1 of the stepping motor 15 (movement amount of pressing member 12) until the contact surface 12a of the pressing member 12 comes into contact with the tablet W1 from the reference position at the timing when this signal is input.

The number of pulses P2 of the stepping motor 15 until the contact surface 12a of the pressing member 12 comes into contact with the wall portion 1A from the reference position is predetermined. Therefore, the control unit 20 measures the length of the tablet W1 in the short axis direction by calculating P2−P1.

When the measurement of the length of the tablet W1 in the short axis direction is completed, the pressing member 12 is moved in a direction away from the wall portion 1A by the stepping motor 15. When the pressing member 12 is separated from the placement surface 11a of the flap 11, the swing shaft 13 is rotated by the actuator 23, and the flap 11 swings upward from the horizontal posture with the swing shaft 13 as a fulcrum (refer to FIG. 5C).

As a result, the tablet W1 moves toward the projecting portion 11A due to the own weight and abuts against the wall surface 11b of the projecting portion 11A. At this time, the orientation of the tablet W1 is changed from the second orientation to the third orientation, and the long axis direction is the same as the movement direction B of the pressing member 12.

Next, the swing shaft 13 is rotated by the actuator 23, and the flap 11 swings to a horizontal posture with the swing shaft 13 as a fulcrum.

Next, the pressing member 12 is moved in a direction approaching the wall portion 1A by the stepping motor 15. At this time, the contact surface 12a of the pressing member 12 comes into contact with the tablet W1 in the third orientation on the placement surface 11a, so that the tablet W1 is moved toward the wall portion 1A along the wall surface 11b of the projecting portion 11A, and the tablet W1 in the state of maintaining the third orientation is pressed against the wall portion 1A (refer to FIG. 5D).

When the tablet W1 is pressed against the wall portion LA, a signal corresponding to the pressing force is transmitted from the load cell 16 to the control unit 20. The control unit 20 calculates the number of pulses P3 of the stepping motor 15 (movement amount of pressing member 12) until the contact surface 12a of the pressing member 12 comes into contact with the tablet W1 from the reference position at the timing when this signal is input.

The control unit 20 measures the length of the tablet W1 in the long axis direction by calculating P2−P3. Next, since the control unit 20 drives the stepping motor 15, the pressing member 12 is further moved toward the wall portion 1A side, and the tablet W1 is strongly pressed against the wall portion 1A.

When the pressing force of the pressing member 12 increases, the output signal of the load cell 16 increases. When the pressing force of the pressing member 12 is further increased and the tablet W1 is crushed, the output signal of the load cell 16 is decreased at the moment of crushing.

The control unit 20 determines the peak value of the output signal of the load cell 16 as the hardness (breaking strength) of the tablet W1. Since the peak value at the moment tablet W1 is crushed may be very steep, the control unit 20 sets an appropriate sampling rate according to the hardness of tablet W.

In addition, the hardness in the long axis direction of tablet W1 is measured because the hardness in the long axis direction is lower than that in the short axis direction. That is, this is because the tablet W1 is easily crushed.

Figure 5C:
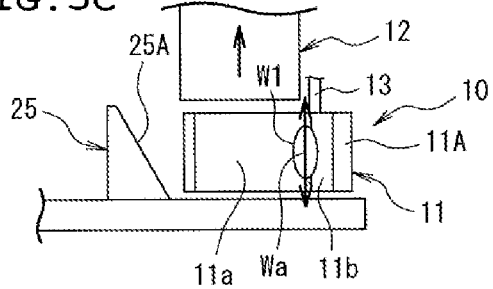
Figure 5C:
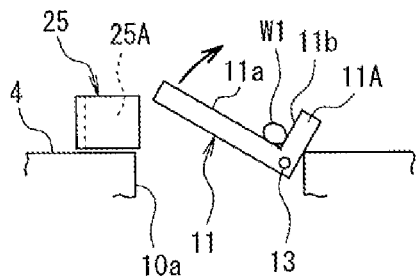
Figure 5D:
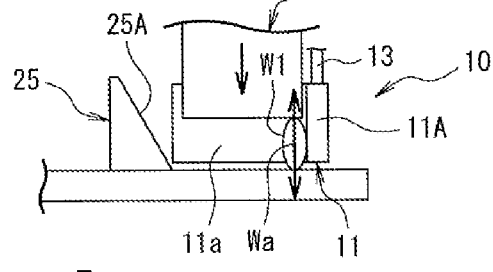
Figure 5D:
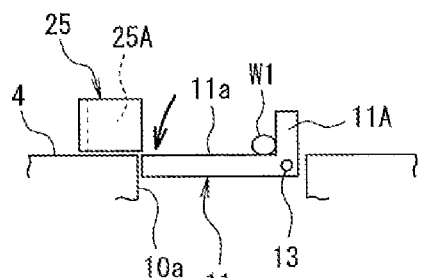
Figure 5E:
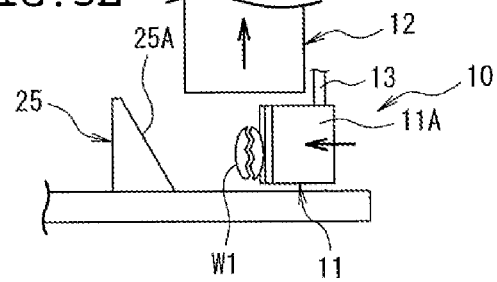
Figure 5E:
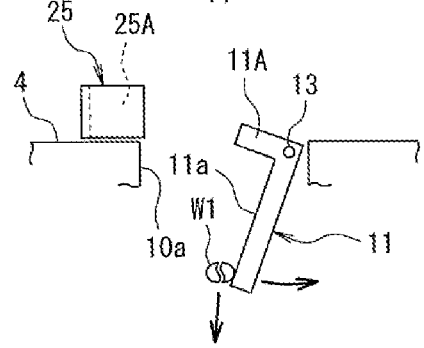

When the hardness measurement of the tablet W1 is completed, the swing shaft 13 is rotated by the actuator 23, and the flap 11 swings downward from the horizontal posture with the swing shaft 13 as a fulcrum (refer to FIG. 5E).

As a result, the crushed tablet W1 is dropped from the discharge hole 10a and removed from the placement surface 11a of the flap 11. Thereafter, the procedure of FIGS. 5A to 5E are repeated for the tablets W2, W3, and W4 conveyed from the thickness measuring portion 9. The same applies to tablets W after the tablet W4.

Here, the fact that the tapered surface 25A is formed on the most downstream conveying member 25 in the conveying direction of the tablet W is because the possibility that the tablets W are moved outward along the tapered surface (direction away from wall portion 1A) every time the tablets W are sequentially conveyed from the upstream conveying member 5 to the downstream conveying member 5, if a tapered surface having the same shape as the tapered surface 25A is formed on the upstream conveying member 5, when the tablet W is brought into contact with the tapered surface and conveyed.

In the article orientation change device 30 of the present embodiment, when the tablet W is conveyed by the conveying member 5 on the upstream side of the conveying member 25 in the conveying direction of the tablet W, since the tip end of the tablet W in the long axis direction is brought into contact with the tapered surface 5b of the conveying member 5, the tablet W can be prevented from moving outward.

As described above, the article orientation change device 30 of the present embodiment is provided with the placement surface 11a on which the non-circular tablet W having the long axis wa and the short axis wb is placed, the flap 11 having the projecting portion 11A projecting upward from the placement surface 11a and provided to be vertically swingable about the swing shaft 13 as a fulcrum, and the conveying member 25 that is provided so as to be movable in a direction facing the wall surface 11b formed by the projecting portion 11A and approaching the projecting portion 11A and in a direction away from the projecting portion 11A, and moves in a direction approaching the projecting portion 11A to push out the tablet W to a predetermined position on the placement surface 11a.

In addition, the article orientation change device 30 is provided with the wall portion 1A provided adjacent to the flap 11 in a direction B orthogonal to the movement direction A of the conveying member 25, and the pressing member 12 that is provided so as to be movable in a direction facing the wall portion 1A and approaching the wall portion LA and in a direction away from the wall portion 1A, in a direction B orthogonal to the movement direction A of the conveying member 25, and moves in a direction approaching the wall portion 1A to press the tablet W against the wall portion 1A.

On the facing surface of the conveying member 25 that faces the wall surface 11b of the projecting portion 11A in the movement direction A of the conveying member 25, the tapered surface 25A in contact with the tablet W is provided so that the long axis wa of the tablet W is inclined with respect to the movement direction A of the conveying member 25 in a first orientation, and the conveying member 25 conveys the tablet W to the placement surface 11a while maintaining the first orientation of the tablet W, and pushes out the tablet W to a predetermined position.

In addition to this, the pressing member 12 moves in a direction approaching the wall portion 1A and changes the orientation of the tablet W pushed out to the predetermined position on the placement surface 11a from the first orientation to the second orientation.

As a result, after the tablet W is conveyed to the placement surface 11a by the conveying member 25 while maintaining the first orientation in which the long axis wa is inclined with respect to the movement direction A of the conveying member 25, since the pressing member 12 is moved in a direction approaching the wall portion 1A to be brought the pressing member 12 into contact with the tablet W, the orientation of the tablet W can be easily changed from the first orientation to the second orientation.

Next, since the flap 11 is swung upward with the swing shaft 13 as a fulcrum, and the tablet W is moved by the own weight along the placement surface 11a to the projecting portion 11A to be brought into contact with the projecting portion 11A, the orientation of the tablet W can be easily changed from the second orientation to the third orientation.

As described above, the article orientation change device 30 having a simple configuration including the wall portion 1A, the flap 11, the conveying member 25, and the pressing member 12 can easily change the orientation of the tablets W on the placement surface 11a to the first orientation, the second orientation, and the third orientation.

In addition, according to the article orientation change device 30 of the present embodiment, in a state where the conveying member 25 is separated from the placement surface 11a, the pressing member 12 is moved the tablet W in the first orientation at a predetermined position on the placement surface 11a toward the wall portion 1A, so that the orientation of the tablet W is changed from the first orientation to the second orientation.

Next, in a state where the pressing member 12 is separated from the placement surface 11a, the flap 11 swings upward from the horizontal posture, so that the tablet W is abutted against the wall surface 11b of the projecting portion 11A, and the orientation of the tablet W is changed from the second orientation to the third orientation in which the long axis wa is in the same direction as the movement direction B of the pressing member 12.

As a result, the orientation of the tablet W can be easily changed between the short axis direction and the long axis direction on the same placement surface 11a, and the installation space for the article orientation change device 30 can be reduced.

In addition, according to the article orientation change device 30 of the present embodiment, the load cell 16 and the control unit 20 that measure the length in the short axis direction, the length in the long axis direction, and hardness of the tablet W are provided.

When the pressing member 12 presses the tablet W in the second orientation on the placement surface 11a against the wall portion 1A, the control unit 20 measures the length of the tablet W in the short axis direction based on the number of output pulses of the stepping motor 15.

In addition, when the tablet W in the third orientation on the placement surface 11a is pressed against the wall portion 1A by the pressing member 12, the control unit 20 measures the length in the long axis direction and the hardness of the tablet W based on the number of output pulses of the stepping motor 15 and the signal corresponding to the pressing force transmitted from the load cell 16.

As a result, the length in the short axis direction and the length in the long axis direction of the tablet W can be measured on the same placement surface 11a, and the time required for measuring the shape of the tablet W can be shortened. The measuring portion that measures the hardness of the tablet W is not limited to the load cell 16.

In addition, since the hardness of the tablet W can be continuously measured on the same placement surface 11a after measuring the length of the tablet W in the long axis direction, the shape and hardness of the tablet W can be easily measured on the same placement surface 11a, the time for measuring the shape and hardness of the tablet W can be shortened, and the installation space for the article orientation change device 30 can be reduced.

In addition, in the article orientation change device 30 of the present embodiment, the projecting portion 11A extends linearly along the movement direction B of the pressing member 12.

As a result, in a case where the tablet W is in the third orientation, the long axis wa of the tablet W can be extended along the projecting portion 11A. Therefore, the pressing member 12 can move the tablet W parallel to the wall portion 1A along the projecting portion 11A. Therefore, it is possible to prevent the tablet W from tilting and maintain the orientation of the tablet W in the third orientation.

In addition, according to the article orientation change device 30 of the present embodiment, the discharge hole 10a that discharges the tablet W is provided, and when the flap 11 swings downward from the horizontal posture, the tablet W is discharged from the placement surface 11a to the discharge hole 10a.

As a result, the tablet W can be discharged from the placement surface 11a only by swinging the flap 11 downward from the horizontal posture. Therefore, the tablet W crushed during hardness measurement of the tablet W can be easily removed from the placement surface 11a in a short time, and a new tablet W can be conveyed to the placement surface 11a.

As a result, the inspection time for the article of tablets W can be significantly shortened. In addition to this, the discharge hole 10a and the flap 11 can be installed on the same plane, and the installation area of the article orientation change device 30 can be reduced more effectively.

Although the article inspection apparatus 1 of the present embodiment measures the diameter and hardness of a non-circular tablet W, the article inspection apparatus 1 may measure the diameter and hardness of a circular tablet. In this case, for example, since the procedure of FIGS. 5A, 5B, and 5E are repeated, the diameter and hardness of the circular tablet are measured, and then the tablet may be discharged from the diameter/hardness measuring portion 10.

In addition, in a case where the article inspection apparatus 1 is used as an apparatus for inspecting the tablet that does not need to be changed in orientation, such as a circular tablet, the diameter/hardness measuring portion 10 may be eliminated from the downstream article conveying portion 3, and a discharge portion for discharging the tablet may be provided at the position of the diameter/hardness measuring portion 10.

Figure 6A:
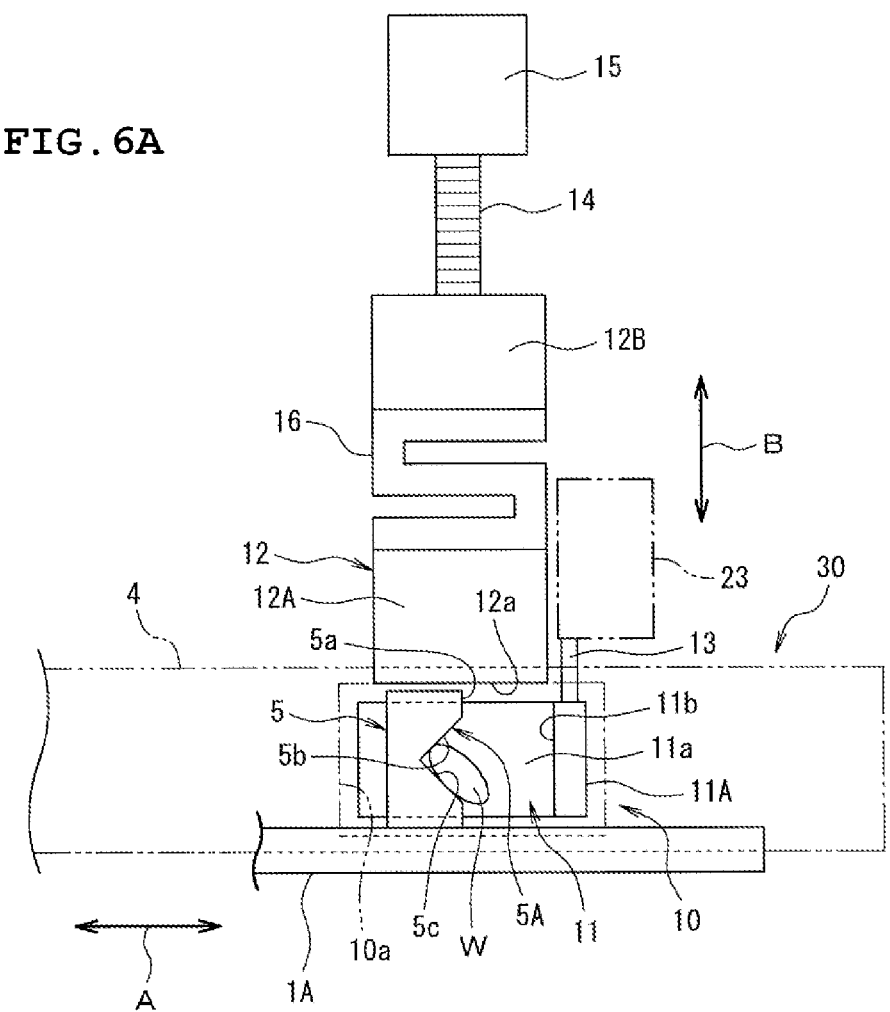
FIG. 6A is a schematic plan view of the article orientation change device having another shaped conveying member according to the embodiment of the present invention.
Figure 6B:
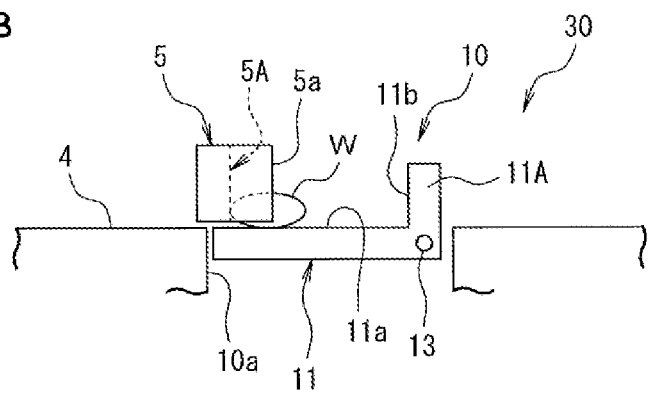
FIG. 6B is a schematic side view of the article orientation change device having another shaped conveying member according to the embodiment of the present invention.

In addition, in the article orientation change device 30 of the present embodiment, the conveying member 25 may be replaced with the conveying member 5, as illustrated in FIGS. 6A and 6B. Specifically, in a plan view of the conveying member 5, the V-shaped groove portion 5A is formed which is recessed in a direction away from the projecting portion 11A on the facing surface 5a of the conveying member 5 facing the wall surface 11b of the projecting portion 11A in the movement direction A of the conveying member 5.

The groove portion 5A includes the tapered surfaces 5b and 5c that are inclined with respect to the movement direction A of the conveying member 5. The groove portions 5A of the present embodiment constitutes a contact portion.

Even with this configuration, when the tablet W is brought into contact with the groove portion 5A of the conveying member 5, the orientation of the tablet W can be maintained in the first orientation in which the long axis wa is inclined with respect to the movement direction A of the conveying member 5.

That is, since the groove portion 5A includes the tapered surfaces 5b and 5c that are inclined with respect to the movement direction A of the conveying member 5, when the tablet W is supported by the groove portion 5A, by being brought into contact with the tablet W along the tapered surface 5b or the tapered surface 5c, the orientation of the tablet W can be maintained in the first orientation in which the long axis wa is inclined with respect to the movement direction A of the conveying member 5.

Figure 7:
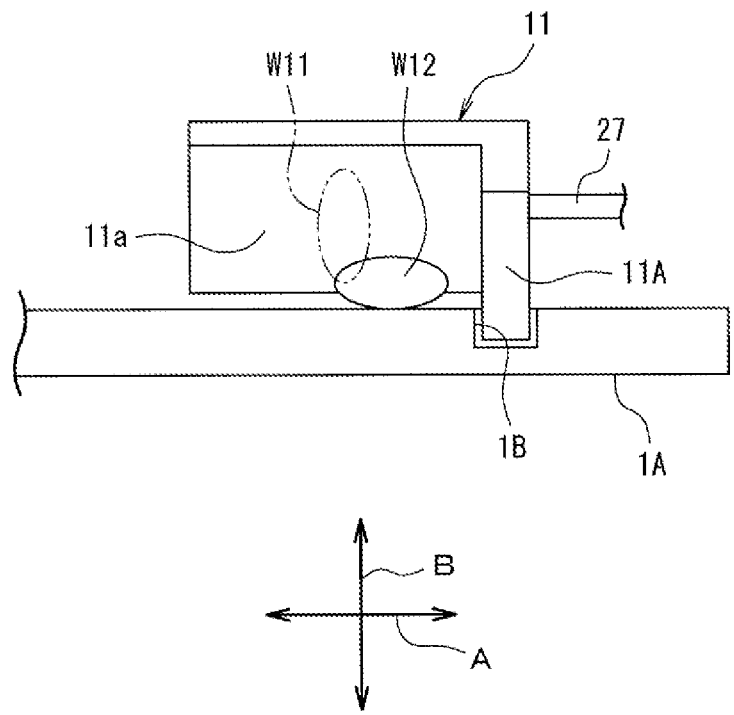
FIG. 7 is a diagram illustrating a state where a placement member is swung about a second swing shaft in the article inspection apparatus provided with the article orientation change device according to the embodiment of the present invention.

In addition, in the article inspection apparatus 1 of the present embodiment, as illustrated in FIG. 7, in a plan view of the flap 11, the flap 11 may be provided so as to be swingable about the swing shaft 27 with the swing shaft 27 orthogonal to the swing shaft 13 as a fulcrum.

The swing shaft 27 extends in the same direction as the movement direction A of the conveying member 5, and is configured to include, for example, a motor shaft of a motor (not illustrated). The swing shaft 13 of the present embodiment constitutes a first swing shaft, and the swing shaft 27 constitutes a second swing shaft.

In this manner, when the flap 11 is swung in a direction toward the wall portion 1A with the swing shaft 27 as a fulcrum, that is, when the flap 11 is swung so that the wall portion 1A side of the flap 11 faces downward, by being brought the tablet W into contact with the wall portion 1A, the orientation of the tablet W can be easily changed from the first orientation to the second orientation.

Therefore, in the step of FIG. 5B, when the pressing member 12 is moved in a direction approaching the wall portion 1A to bring the pressing member 12 into contact with the tablet W, the orientation of the tablet W can be reliably maintained in the second orientation.

That is, in the same step as the step of FIG. 5A, when the tablet W is held in the groove portion 5A of the conveying member 5 and conveyed to the diameter/hardness measuring portion 10, in a case where the tablet W is not oriented in the first orientation for some reason, and the long axis wa of the tablet W is oriented in the same direction as the movement direction B of the pressing member 12 (refer to tablet W11 in FIG. 7), the flap 11 is swung about the swing shaft 27 as a fulcrum so that the wall portion 1A side of the flap 11 faces downward.

At this time, by being brought the tablet W into contact with the wall portion 1A, the orientation of the tablet W can be easily changed from the first orientation to the second orientation (refer to tablet W12 in FIG. 7). Therefore, the length of the tablet W in the short axis direction can be reliably measured.

In addition, when the flap 11 is swung about the swing shaft 27 as a fulcrum so that the wall portion 1A side of the flap 11 faces downward, in order to prevent the projecting portion 11A from being caught on the wall portion LA, an escape groove 1B of the projecting portion 11A is formed in the wall portion 1A.

In addition, in parallel, the flap 11 may be vibrated by an actuator (not illustrated). In this manner, the orientation of the tablet W can be changed more easily from the first orientation to the second orientation.

In addition, in a case where the flap 11 is provided so as to be swingable about the swing shaft 27 with the swing shaft 27 as a fulcrum, the groove portion 5A (or the tapered surface 25A, the same applies hereinafter) of the conveying member 5 (or the conveying member 25, the same applies hereinafter) may be eliminated.

That is, when the tablet W is pushed onto the placement surface 11a by the conveying member 5 in which the groove portion 5A is not formed, the orientation of the tablet W pushed onto the placement surface 11a is not necessarily the orientation in which the long axis wa is inclined with respect to the movement direction A of the conveying member 5, that is, the orientation is uncertain.

In the flap 11 including the swing shaft 13 and the swing shaft 27 of the present embodiment, by being swung by the swing shaft 27, the orientation of the tablet W can be changed from the fourth orientation, which is an uncertain orientation, to the second orientation, and by being swung by the swing shaft 13, can be changed from the second orientation to the third orientation.

In a case where the tablet W is pushed out onto the placement surface 11a of the flap 11 on which the swing shaft 13 is installed by the conveying member 5 in which the groove portion 5A is formed, it is in the first orientation, and the first orientation is the orientation in which the long axis wa of the tablet W is inclined with respect to the movement direction A of the conveying member 5.

In addition, in a case where the tablet W is pushed out onto the placement surface 11a of the flap 11 on which the swing shaft 13 and the swing shaft 27 are installed by the conveying member 5 in which the groove portion 5A is not formed, it is in the fourth orientation, and the fourth orientation is in a plurality of different orientations that are uncertain orientations.

As described above, the article orientation change device 30 of the present embodiment is provided with the flap 11 provided so as to be vertically swingable about the swing shaft 13 as a fulcrum, and provided so as to be swingable about a swing shaft 27, with the swing shaft 27 orthogonal to the swing shaft 13 as a fulcrum. The first conveying member 5 pushes out the tablet W to a predetermined position on the placement surface 11a in the fourth orientation in which the orientation of the tablet W is uncertain. When the tablet W is conveyed onto the placement surface 11a by the first conveying member 5, the flap 11 swings in the direction of the wall portion 1A with the swing shaft 27 as a fulcrum to bring the tablet W abutted against the wall portion 1A, so that the orientation of the tablet W is changed from the fourth orientation to the second orientation.

Even in this manner, the article orientation change device 30 having a simple configuration including the wall portion 1A, the flap 11, the conveying member 25, and the pressing member 12 can easily change the orientation of the tablet W to the fourth orientation, the second orientation, and the third orientations on the placement surface 11a.

Figure 8:
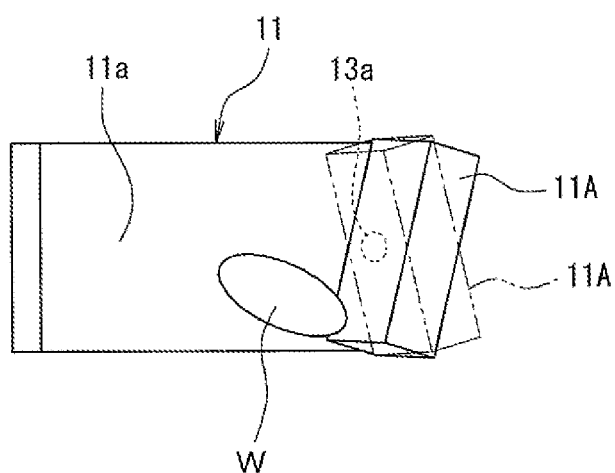
FIG. 8 is a diagram illustrating another configuration of a placement member of the article orientation change device according to the embodiment of the present invention, and is a plan view of the placement member in a state of being swung upward from a horizontal posture.

In addition, in a plan view of the flap 11, the projecting portion 11A may be provided so as to be rotatable with respect to the placement surface 11a of the flap 11. That is, as illustrated in FIG. 8, the projecting portion 11A may be provided separately from the flap 11, and the projecting portion 11A may be rotatable about a rotating shaft 13a as a fulcrum with respect to the flap 11, in a plan view of the flap 11.

In this manner, in FIG. 5C, the projecting portion 11A is rotated about the rotating shaft 13a as a fulcrum, in a state where the flap 11 swings upward from the horizontal posture, so that the projecting portion 11A can reliably change the orientation of the tablet W from the second orientation to the third orientation.

In addition, in parallel, the flap 11 may be vibrated by an actuator (not illustrated). In this manner, the orientation of the tablet W can be changed more easily from the second orientation to the third orientation.

Although embodiments of the present invention have been disclosed, it will be apparent to those skilled in the art that modifications may be made without departing from the scope of the invention. All such modifications and equivalents are intended to be included in the following aspects.

DESCRIPTION OF REFERENCE NUMERALS AND SIGNS 1A wall portion
5 conveying member (first moving member)
5A groove portion (contact portion)
5a facing surface
10a discharge hole (discharge portion)
11 flap (placement member)
11A projecting portion
11a placement surface
11b wall surface
12 pressing member (second moving member)
13 swing shaft (first swing shaft)
16 load cell (measuring portion)
20 control unit (measuring portion)
25 conveying member (first moving member)
25A tapered surface (contact portion)
27 swing shaft (second swing shaft)
30 article orientation change device
W tablet (article)
wa long axis
wb short axis

What is claimed is:

1. An article orientation change device that changes an orientation of a non-circular article having a long axis and a short axis orthogonal to the long axis, the device comprising:
a placement member that includes a placement surface on which the article is placed and a projecting portion projecting upward from the placement surface, and is provided so as to be vertically swingable about a first swing shaft as a fulcrum;
a first moving member that is provided so as to be movable in a direction facing a wall surface formed by the projecting portion and approaching the projecting portion and in a direction away from the projecting portion, and moves in the direction approaching the projecting portion to push out the article to a predetermined position on the placement surface;
a wall portion that is provided adjacent to the placement member in a direction orthogonal to a movement direction of the first moving member; and
a second moving member that is provided so as to be movable in a direction facing the wall portion and approaching the projecting portion and in a direction away from the wall portion, and moves in the direction approaching the wall portion to press the article against the wall portion, in the direction orthogonal to the movement direction of the first moving member, wherein
on a facing surface of the first moving member facing the wall surface of the projecting portion in the movement direction of the first moving member, a contact portion that contacts the article is provided so that the long axis of the article is in a first orientation oblique to the movement direction of the first moving member,
the first moving member pushes out the article to the predetermined position on the placement surface in a state where the article maintains the first orientation, and
the second moving member moves in the direction approaching the wall portion to change an orientation of the article pushed out to the predetermined position on the placement surface from the first orientation to a predetermined orientation.

2. The article orientation change device according to claim 1, wherein
the predetermined orientation is a second orientation in which the long axis of the article is parallel to the movement direction of the first moving member,
in a state where the first moving member is separated from the placement surface, the second moving member changes the orientation of the article from the first orientation to the second orientation by moving the article in the first orientation at the predetermined position on the placement surface toward the wall portion, and
next, in a state where the second moving member is separated from the placement surface, by swinging the placement member upward from a horizontal posture, the article is abutted against the wall surface of the projecting portion, and the orientation of the article is changed from the second orientation to a third orientation in which the long axis is in the same direction as a movement direction of the second moving member.

3. The article orientation change device according to claim 2, wherein
in a plan view of the first moving member, the contact portion is a tapered surface oblique to the movement direction of the first moving member.

4. The article orientation change device according to claim 2, wherein
in a plan view of the first moving member, the contact portion is configured to include a V-shaped groove portion recessed in the direction away from the projecting portion with respect to the facing surface of the first moving member.

5. The article orientation change device according to claim 2, wherein
in a plan view of the placement member, the placement member is provided so as to be swingable about a second swing shaft orthogonal to the first swing shaft as a fulcrum.

6. The article orientation change device according to claim 2, further comprising:
a measuring portion that measures a length in a short axis direction, a length in a long axis direction, and hardness of the article, wherein
when the article in the second orientation on the placement surface is pressed against the wall portion by the second moving member, the measuring portion measures the length in the short axis direction of the article, and when the article in the third orientation on the placement surface is pressed against the wall portion by the second moving member, the measuring portion measures the length in the long axis direction and the hardness of the article.

7. The article orientation change device according to claim 2, wherein
in a plan view of the placement member, the projecting portion is provided so as to be rotatable with respect to the placement surface of the placement member.

8. The article orientation change device according to claim 1, wherein
in a plan view of the first moving member, the contact portion is a tapered surface oblique to the movement direction of the first moving member.

9. The article orientation change device according to claim 1, wherein in a plan view of the first moving member, the contact portion is configured to include a V-shaped groove portion recessed in the direction away from the projecting portion with respect to the facing surface of the first moving member.

10. The article orientation change device according to claim 1, wherein
in a plan view of the placement member, the placement member is provided so as to be swingable about a second swing shaft orthogonal to the first swing shaft as a fulcrum.

11. The article orientation change device according to claim 1, wherein
the wall surface of the projecting portion extends linearly along a movement direction of the second moving member.

12. The article orientation change device according to claim 1, further comprising:
a discharge portion that discharges the article, wherein
when the placement member swings downward from a horizontal posture, the article is discharged from the placement surface to the discharge portion.

13. An article orientation change device that changes an orientation of a non-circular article having a long axis and a short axis orthogonal to the long axis, the device comprising:
a placement member that includes a placement surface on which the article is placed and a projecting portion projecting upward from the placement surface, is provided so as to be vertically swingable about a first swing shaft as a fulcrum, and is provided so as to be swingable about a second swing shaft orthogonal to the first swing shaft with the second swing shaft as a fulcrum;
a first moving member that is provided so as to be movable in a direction facing a wall surface formed by the projecting portion and approaching the projecting portion and in a direction away from the projecting portion, and moves in the direction approaching the projecting portion to push out the article to a predetermined position on the placement surface;
a wall portion that is provided adjacent to the placement member in a direction orthogonal to a movement direction of the first moving member; and
a second moving member that is provided so as to be movable in a direction facing the wall portion and approaching the projecting portion and in a direction away from the wall portion, and moves in the direction approaching the wall portion to press the article against the wall portion, in the direction orthogonal to the movement direction of the first moving member, wherein
the first moving member pushes out the article to the predetermined position on the placement surface in a fourth orientation in which an orientation of the article is uncertain, and
when the article is conveyed onto the placement surface by the first moving member, the placement member swings about the second swing shaft as a fulcrum in a direction of the wall portion to abut the article against the wall portion, so that the orientation of the article is changed from the fourth orientation to a predetermined orientation.

14. The article orientation change device according to claim 13, wherein
the predetermined orientation is a second orientation in which the long axis of the article is parallel to the movement direction of the first moving member, and by swinging the placement member upward from a horizontal posture by the first swing shaft, the article is abutted against the wall surface of the projecting portion, and the orientation of the article is changed from the second orientation to a third orientation in which the long axis is in the same direction as a movement direction of the second moving member.

15. The article orientation change device according to claim 14, further comprising:
a measuring portion that measures a length in a short axis direction, a length in a long axis direction, and hardness of the article, wherein
when the article in the second orientation on the placement surface is pressed against the wall portion by the second moving member, the measuring portion measures the length of the article in the short axis direction, and
when the article in the third orientation on the placement surface is pressed against the wall portion by the second moving member, the measuring portion measures the length in the long axis direction and hardness of the article.

16. The article orientation change device according to claim 14, wherein
in a plan view of the placement member, the projecting portion is provided so as to be rotatable with respect to the placement surface of the placement member.

17. The article orientation change device according to claim 13, wherein
the wall surface of the projecting portion extends linearly along a movement direction of the second moving member.

18. The article orientation change device according to claim 13, further comprising:
a discharge portion that discharges the article, wherein
when the placement member swings downward from a horizontal posture, the article is discharged from the placement surface to the discharge portion.

* * * * *